United States Patent [19]
Tarchalski

[11] 3,737,726
[45] June 5, 1973

[54] EARTH LEAKAGE DETECTOR FOR OPERATING CIRCUIT INTERRUPTING MEANS

[75] Inventor: Edward Tarchalski, Johannesburg, Transvaal, Republic of South Africa

[73] Assignee: Heinemann Electric, Republic of South Africa Limited, Johannesburg, Republic of South Africa

[22] Filed: Mar. 28, 1972

[21] Appl. No.: 238,801

[52] U.S. Cl............317/18 D, 317/27 R, 317/33 R, 317/33 C
[51] Int. Cl...............................................H02h 1/02
[58] Field of Search.............317/18 D, 27 R, 33 R, 317/33 C, 33 SC

[56] References Cited
UNITED STATES PATENTS 3,512,045  5/1970  Tipton......................317/18 D
3,187,225  6/1965  Mayer.......................317/33 C Primary Examiner—J. D. Miller
Assistant Examiner—Harvey Fendelman
Attorney—Irvin S. Thompson and Robert J. Patch

[57] ABSTRACT

A device for detecting the occurrence of an earth leak fault in a circuit the live and neutral conductors of which constitute first and second primary windings of a core-balance transformer or toroid. On the occurrence of an earth leak fault, a voltage is induced into a secondary winding on the toroid. The secondary voltage is rectified and the rectified voltage charges first and second capacitors. The second capacitor is charges to a lower voltage than the first capacitor. When the first capacitor is fully charged a first switching device is energised. This, in turn, causes a second switching device to be energised allowing the second capacitor to discharge into and operate a circuit breaker or the like. By using two capacitors in the manner described above the toroid is operated in a more efficient manner than has hitherto been possible.

6 Claims, 1 Drawing Figure

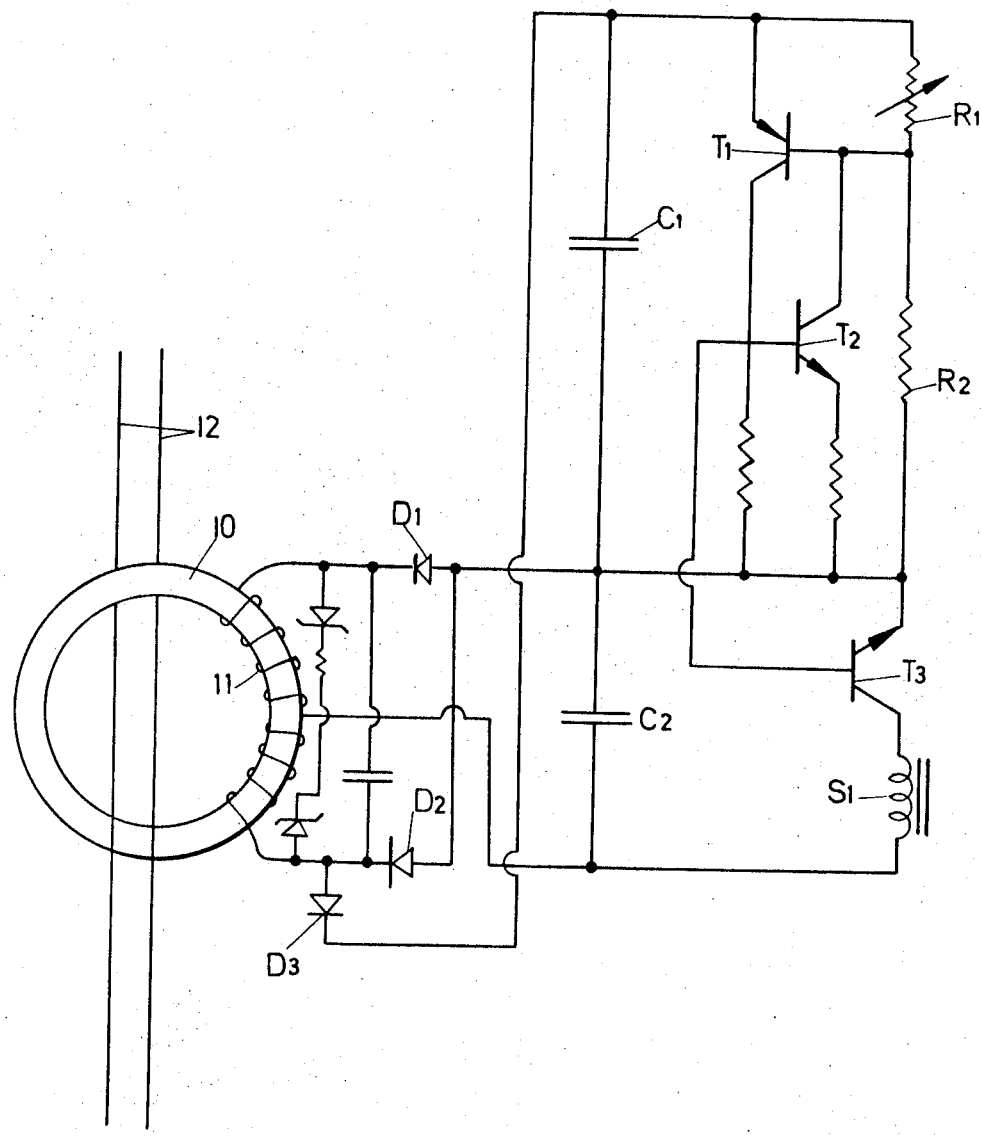

EARTH LEAKAGE DETECTOR FOR OPERATING CIRCUIT INTERRUPTING MEANS

This invention relates to earth leakage detectors for operating circuit interrupting means.

In earth leakage devices of the power independent or passive type utilizing polarized releases operated directly by core balance transformers or toroids, it is virtually impossible to design the toroids to have high current ratings and yet be of small dimensions. This is primarily due to the fact that the available power from the toroid is utilized in an inefficient manner in conventional devices.

For example it is known to store the energy from the toroid in a single capacitor and then to discharge this energy by means of some switching device such as a silicon controlled rectifier (SCR) or a silicon controlled switch (SCS) through the operating coil of the circuit interrupting means.

Since the operating coil of the circuit interrupting means requires a certain amount of current of certain duration to operate it, and the switching device requires a voltage in excess of its minimum forward or, saturation voltage to operate, this results in the capacitor being charged to a substantial voltage in a given time. Since the capacitor, when discharged by the switching means, only discharges to the saturation voltage of the switching device, which may be of the order of 1 to 2 volts, the charge remaining in the capacitor is wasted. Typically an SCS or SCR has a maximum forward or saturation voltage of 1.5 to 2 volts (for unselected commercial components) and a capacitor of some 100 microfarad is required to give a discharge current of sufficient magnitude and duration to operate the operating coil. The capacitor has to be charged to about 2.5 volts. When the switching device is triggered, the capacitor discharges from 2.5 to 2 volts. The initial charge stored is equal to $100 \times 2.5 \times 10^{-6}$ coulomb and at the end of discharge the charge is $100 \times 2 \times 10^{-6}$ coulomb. Thus 80 percent of the charge remains unused in the capacitor. The capacitor may have to be charged to an even higher voltage to prevent the SCR from cutting off too quickly thus reducing the duration of the discharge.

It is an object of the present invention to provide an earth leakage device in which the power available from the toroid is utilized in a much more efficient manner than as hitherto been possible.

An earth leakage detector for operating circuit interrupting means, according to the invention, comprises a core balance transformer having a tapped secondary winding and means to rectify the voltages induced in the secondary winding as a result of an unbalance to give a higher voltage and a lower voltage. A first storage device is charged to a predetermined voltage by the higher rectified voltage. A first switching device is energized by the first storage device when charged. A second storage device is charged by the lower rectified voltage, and a second switching device is energized when the first switching device is energized to enable the second storage device to discharge into and operate the circuit interrupting means via the second switching means.

An example of the invention is described hereunder with reference to the accompanying circuit diagram.

In the FIGURE there is illustrated the conventional arrangement of a toroid 10, a center tapped secondary winding 11 and live and neutral conductors 12 passing through the toroid and leading to the circuit to be protected.

On the occurrence of an earth fault in the circuit to be protected, a voltage will be induced into the secondary winding 11 as a result of the unbalance. When this happens, the capacitors C1 and C2 will be charged.

The capacitor C2 which is connected between the center-tap of the secondary winding and the connection between the anodes of diodes D1 and D2, is charged with full wave rectified current alternately via the diodes D1 and D2 during alternate half cycles of the induced voltage and the capacitor C1 which is connected via diodes D1 and D3 to the outer ends of the secondary winding is charged with half wave rectified current via diodes D1 and D3. Furthermore the capacitor C1 is adapted to be charged to twice the potential of C2. Typically the capacitor C1 is charged to 1.6 volts and the capacitor C2 is charged to 0.8 volts.

The Diode D1 is a common rectifier Diode when both C1 and C2 are being charged. This ensures that the ratio of voltages to which C1 and C2 are charged remains constant since the Diode voltage drop is common to both circuits. It is important to prevent the capacitor C1 from being charged to a potential higher than that required by the design ratio, and if this happens, the trigger or switching circuit T1, T2 may operate before the capacitor C2 has attained its desired level. This could happen when separate Diodes are used for charging capacitors C1 and C2 and when the voltage induced in the secondary winding 11 is high such as at high unbalance.

The capacitor C2 can however be allowed to charge to a voltage level higher than that given by the design ratio of voltages. This can occur if the forward voltage drop of the Diode D2 is smaller than that of the Diode D1. Diode D3 is a blocking Diode which prevents capacitor C1 discharging into capacitor C2 during the half cycle when capacitor C1 is not being charged.

When the voltage of capacitor C1 has attained a value given by the predetermined earth leakage current or current unbalance, R1 of the potential divider R1, R2 is adjusted to cause the switch T1, T2 to turn on i.e. the voltage across R1 is adjusted to the required base-emitter voltage of T1 to cause the T1, T2 switch to turn on.

The switch T1, T2 goes into saturation or bottomed condition and the voltage at the base of T2 rises to nearly the full positive potential.

This sudden step voltage appears at the base of T3 and cuases T3 to go into saturation. Thus the capacitor C2 discharges through the operating coil S1 of a circuit breaker causing operation thereof. Since the saturation voltage of T3 is small, most of the charge stored in C2 is discharged.

Typically the maximum saturation voltage of T3 is 0.25 volts and the capacitor C2 therefore discharges from 0.8 volts to 0.25 volts. In other words 68 percent of the energy of the capacitor C2 is discharged.

The switching circuit T1, T2 is essentially a synthesized SCS or SCR. The saturation voltage of such a switching device is lower than that of an SCS or SCR. Typically the maximum saturation voltage of T1, T2 is 0.9 volts.

With the conventional arrangement employing a single capacitor of about 100 microfarads and an SCS or SCR requiring a voltage of about 2.5 volts for its operation, the capacitor requires a charge of $100 \times 2.5 \times 10^{-6}$ coulombs. = 250 microcoulombs.

With the arrangement of the present invention where C1 is 3 microfarads charged to a voltage of 1.6 volts and C2 is 100 microfarads charged to 0.8 volts, the charge required is $(100 \times 0.8 + 3 \times 1.6) \times 10^{-6}$ coulombs = 84.8 microcoulombs.

The size of the toroid of given characteristics is related directly to the voltage to which a given capacitor is to be charged in a given time.

It can thus be seen that a smaller toroid can be used to charge 100 $\mu$F to 0.8V plus 3 $\mu$F to 1.6 V in a given time than that required to charge 100 $\mu$F to 2.5V in the same time.

I claim :

1. An earth leakage detector for operating circuit interrupting means, comprising a core balance transformer having a tapped secondary winding, means to rectify the voltages induced in the secondary winding as a result of an unbalance to give a higher voltage and a lower voltage, a first storage device which is charged to a predetermined voltage by the higher rectified voltage, a first switching device which is energized by the first storage device when charged, a second storage device which is charged by the lower rectified voltage, and a second switching device which is energized when the first switching device is energized to enable the second storage device to discharge into and operate said circuit interrupting means via the second switching means.

2. An earth leakage detector as claimed in claim 1, and a variable voltage divider connected across the first storage device to adjust the sensitivity of the first switching device.

3. An earth leakage detector as claimed in claim 1, in which the first and second storage devices are charged through a common diode.

4. An earth leakage detector as claimed in claim 1, in which said first and second storage devices are capacitors.

5. An earth leakage detector as claimed in claim 4, in which the first storage device has a capacitance substantially less than that of the second storage device.

6. An earth leakage detector as claimed in claim 1, in which said secondary winding is center tapped and connected to the first storage device in such a way that the entire secondary voltage is applied thereto and connected to the second storage device in such a way that only a center-tapped portion of the secondary voltage is applied thereto.

* * * * *